(12) United States Patent
Andou et al.

(10) Patent No.: US 8,387,079 B2
(45) Date of Patent: Feb. 26, 2013

(54) INFORMATION PROCESSING APPARATUS AND DRIVE CONTROL METHOD

(75) Inventors: Hideaki Andou, Ome (JP); Taisuke Furuya, Hamura (JP); Yasuyuki Mizuura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 13/216,988

(22) Filed: Aug. 24, 2011

(65) Prior Publication Data
US 2012/0066700 A1 Mar. 15, 2012

(30) Foreign Application Priority Data
Sep. 10, 2010 (JP) ................................. 2010-203645

(51) Int. Cl.
*G11B 17/051* (2006.01)
(52) U.S. Cl. ........................................................ 720/602
(58) Field of Classification Search .................. 720/602
See application file for complete search history.

(56) References Cited

U.S. PATENT DOCUMENTS

| | | | | |
|---|---|---|---|---|
| 6,711,117 | B1 * | 3/2004 | Kanbe ........................... | 720/701 |
| 7,168,079 | B2 * | 1/2007 | Iwaasa ........................... | 720/602 |
| 7,484,227 | B2 * | 1/2009 | Fujimoto et al. ............... | 720/619 |
| 7,614,061 | B2 * | 11/2009 | Ko ................................. | 720/602 |
| 8,132,196 | B2 * | 3/2012 | Morris et al. .................. | 720/632 |
| 2006/0200693 | A1 | 9/2006 | Uehara | |
| 2008/0301721 | A1 | 12/2008 | Kaneko et al. | |
| 2009/0138900 | A1 * | 5/2009 | Wu ................................. | 720/651 |
| 2009/0199222 | A1 | 8/2009 | Yamazaki et al. | |

FOREIGN PATENT DOCUMENTS

| | | |
|---|---|---|
| JP | 7-201122 | 8/1995 |
| JP | 11-149689 | 6/1999 |
| JP | 2004-185780 | 7/2004 |
| JP | 2005-216457 | 8/2005 |
| JP | 2005-222679 | 8/2005 |
| JP | 2006-244068 | 9/2006 |
| JP | 2008-299970 | 12/2008 |
| JP | 2009-187606 | 8/2009 |
| JP | 2010-061767 | 3/2010 |

OTHER PUBLICATIONS

Japanese Patent Application No. 2010-203645, Notification of Reasons for Rejection, mailed Nov. 15, 2012, (with English Translation).

* cited by examiner

*Primary Examiner* — Mark Blouin
(74) *Attorney, Agent, or Firm* — Blakely, Sokoloff, Taylor & Zafman LLP

(57) ABSTRACT

According to one embodiment, an information processing apparatus includes a main body, an optical disc drive provided in the main body, an acceleration sensor provided in the main body, and a drive management module provided in the main body. The optical disc drive is configured to output an eject signal to an outside in response to an operation of an eject button. The drive management module is configured to determine whether the main body is shaking or not by using the acceleration sensor when the eject signal is received from the optical disc drive which is in a power-off state, and to supply power to the optical disc drive and send to the optical disc drive a signal instructing opening of a tray of the optical disc drive, when the main body is not shaking.

8 Claims, 6 Drawing Sheets

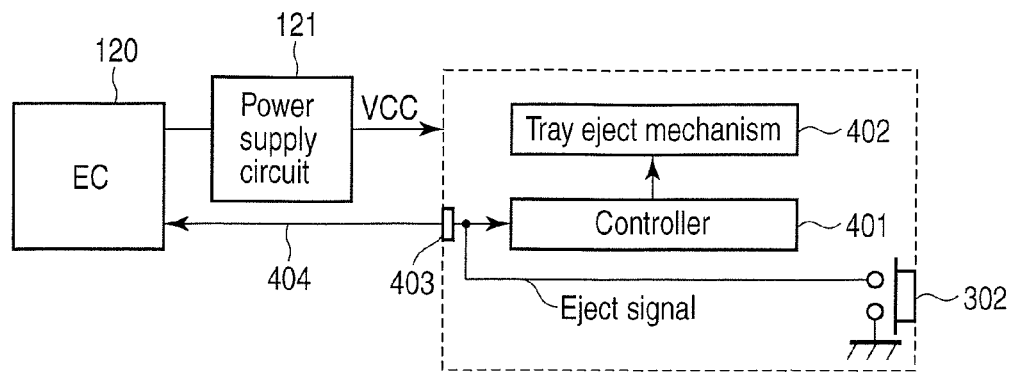
F I G. 3
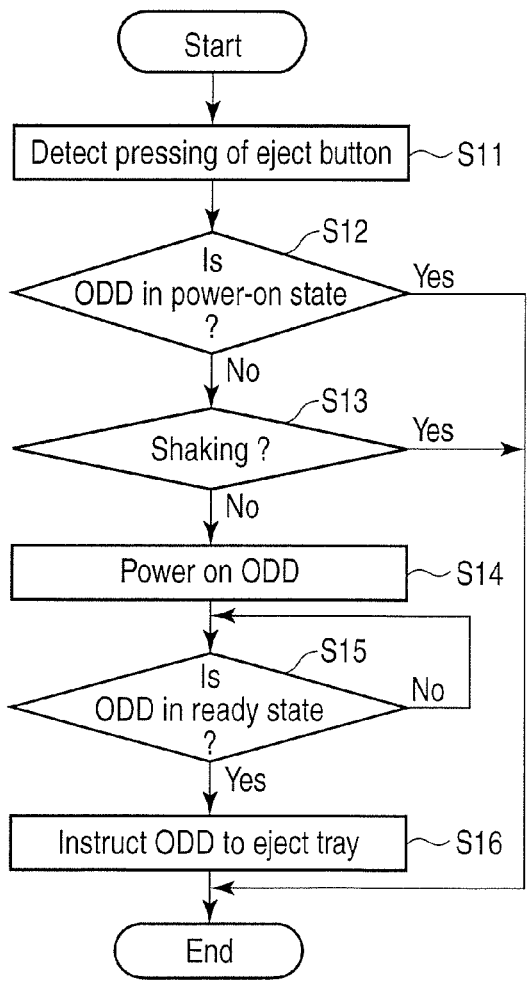
F I G. 4

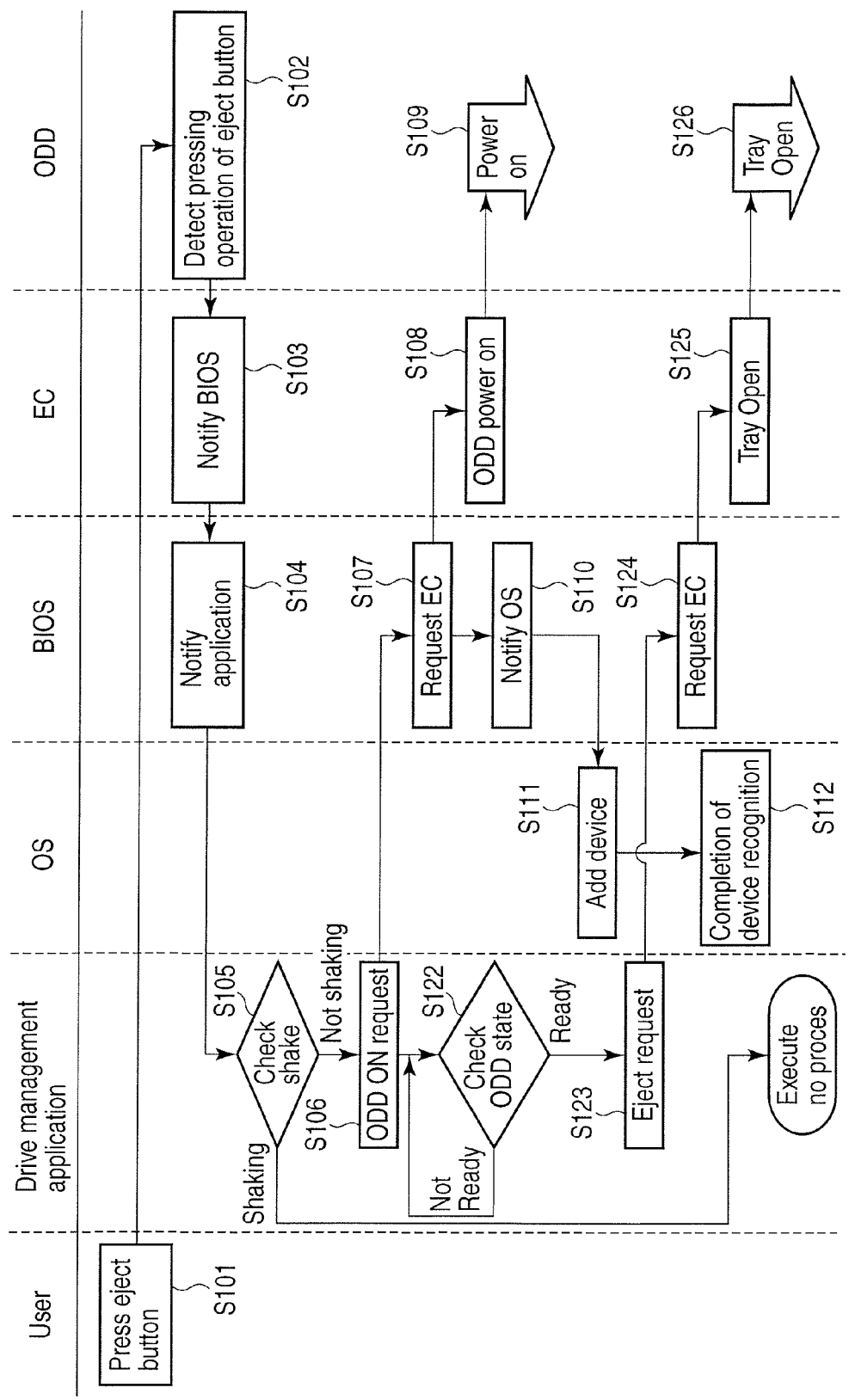
F I G. 5

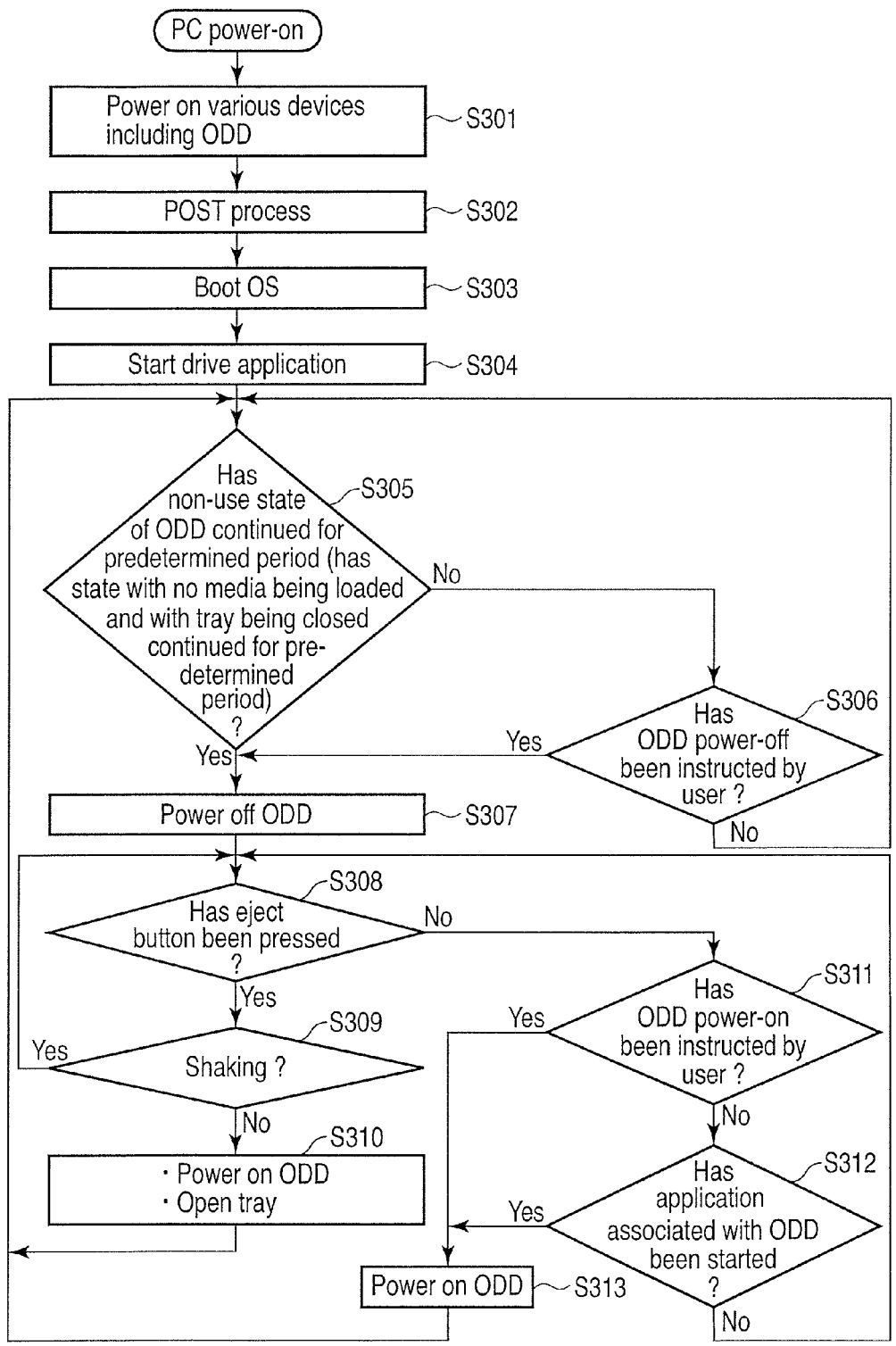
F I G. 7

INFORMATION PROCESSING APPARATUS AND DRIVE CONTROL METHOD

CROSS-REFERENCE TO RELATED APPLICATIONS

This application is based upon and claims the benefit of priority from prior Japanese Patent Application No. 2010-203645, filed Sep. 10, 2010, the entire contents of which are incorporated herein by reference.

FIELD

Embodiments described herein relate generally to an information processing apparatus and a drive control method of driving an optical disc drive in the information processing apparatus.

BACKGROUND

In recent years, various kinds of notebook-type or laptop-type portable personal computers have been developed. Among such portable personal computers, there is a computer in which an optical disc drive for driving media, such as a DVD (Digital Versatile Disc) and a CD (Compact Disc), is built. The housing of the optical disc drive is provided with an eject button for ejecting media. When the eject button has been operated by a user, a controller in the optical disc drive opens the tray of the optical disc drive. Thereby, the user can load, unload, or change media.

In the field of portable personal computers, there has been a demand for achieving power saving of such computers. Recently, to meet the demand, a computer having a function of powering off an optical disc drive, where necessary, has been developed. In the case of resuming the use of the optical disc drive which has once been powered off, the user is required to operate, for example, purpose-specific software in order to power on the optical disc drive. However, the operation of such purpose-specific software may be troublesome for the user.

In addition, recently, a novel tray eject technique has been developed for automatically opening the tray of an optical disc drive in response to an operation of an eject button of the optical disc drive which is in a power-off state.

However, for example, when the user is moving while carrying a computer, it is possible that the arm of the user, for example, may inadvertently come in contact with the eject button. In this case, such a problem may occur that the tray of the optical disc drive is abruptly opened when the user is moving while carrying the computer.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary block diagram illustrating a structure example of an optical disc drive which is provided in the information processing apparatus of the embodiment;

FIG. 4 is an exemplary flow chart illustrating the outline of the procedure of a drive control process which is executed by the information processing apparatus of the embodiment;

FIG. 5 is an exemplary flow chart illustrating an example of the procedure of the drive control process which is executed by the information processing apparatus of the embodiment;

FIG. 7 is an exemplary flow chart for illustrating the entirety of a drive power management process which is executed by the information processing apparatus of the embodiment.

DETAILED DESCRIPTION

Various embodiments will be described hereinafter with reference to the accompanying drawings.

In general, according to one embodiment, an information processing apparatus includes a main body, an optical disc drive provided in the main body, an acceleration sensor provided in the main body, and a drive management module provided in the main body. The optical disc drive is configured to output an eject signal to an outside in response to an operation of an eject button. The drive management module is configured to determine whether the main body is shaking or not, by using the acceleration sensor, when the eject signal is received from the optical disc drive which is in a power-off state, and to supply power to the optical disc drive and send to the optical disc drive a signal instructing opening of a tray of the optical disc drive, when the main body is not shaking.

Figure 1:
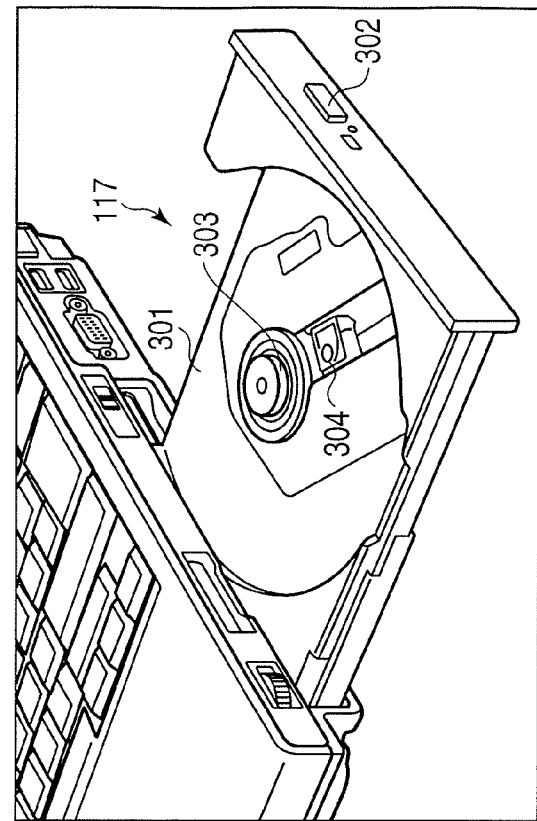
FIG. 1 is an exemplary perspective view illustrating the external appearance of an information processing apparatus according to an embodiment.
Figure 1:
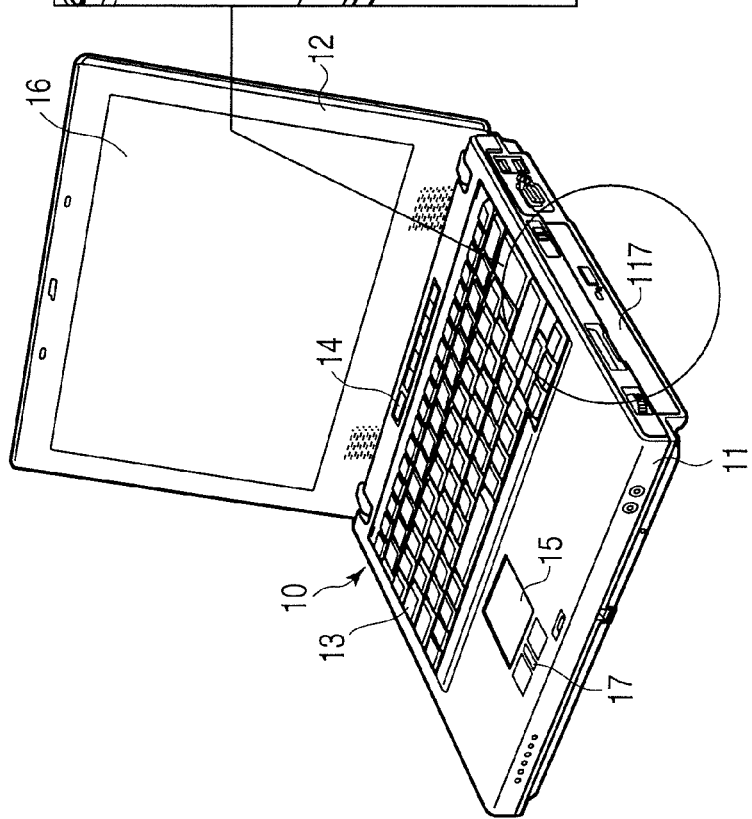

To begin with, referring to FIG. 1, the structure of an information processing apparatus according to an embodiment is described. The information processing apparatus is realized, for example, as a battery-powerable portable notebook personal computer 10.

FIG. 1 is a perspective view showing the computer 10, as viewed from the front side, in the state in which a display unit thereof is opened. The computer 10 comprises a computer main body (also referred to simply as "main body") 11 and a display unit 12. A display device that is composed of an LCD (Liquid Crystal Display) 16 is built in the display unit 12.

The display unit 12 is supported and attached to the computer main body 11 such that the display unit 12 is freely rotatable between an open position where a top surface of the computer main body 11 is exposed and a closed position where the top surface of the computer main body 11 is covered by the display unit 12. The computer 10 can operate, regardless of whether the display unit 12 is closed or opened. In other words, even while the display unit 12 is in the closed state, the computer 10 can continue to operate.

The computer main body 11 has a thin box-shaped casing. A keyboard 13, a power button 14 for powering on/off the computer 10, a touch pad 15 and a fingerprint sensor 17 are disposed on the top surface of the computer main body 11.

In addition, an optical disc drive 117 for driving media (optical disc media) is provided in the computer main body 11. The optical disc drive 117 is configured to be able to access various kinds of optical disc media such as a DVD, a CD, etc. The optical disc drive 117 comprises, for example, a tray 301 on which an optical disc medium is removably mounted, an eject button 302, a spindle motor 303, and an optical pickup head 304.

The tray 301 is attached to the housing of the optical disc drive 117 such that the tray 301 may move between an inserted position where the tray 301 is inserted in the main body 11 and a projected position where the tray 301 is projected to the outside from the main body 11. The eject button 302 is provided on the housing of the optical disk drive 117, for example, on the outer wall of the tray 301. The eject button 302 is a switch for generating an eject signal. The eject signal is generated in response to an operation of the eject button 302, regardless of whether the optical disc drive 117 is in the power-on state or not.

The tray 301 is opened when the eject button 302 has been operated by the user in the state in which the tray 301 is inserted in the main body 11. In other words, when the eject button 302 has been operated by the user, the tray 301 is projected from the inside of the main body 11 to the outside and is moved to the projected position. Specifically, during the period in which the optical disc drive 117 is in the power-on state, the eject signal, which is generated in response to the operation of the eject button 302, is detected by the controller in the optical disc drive 117, and the controller opens the tray 301.

The optical disc drive 117 outputs to the outside the eject signal which is generated by the operation of the eject button 302, regardless of whether the optical disc drive 117 is in the power-on state or not. For example, an eject signal line, which carries the eject signal, is not only connected to the controller in the optical disc drive 117, but is also led to the outside of the optical disc drive 117. Thereby, even in the case where the optical disc drive is in the power-off state (also referred to as "power-down state"), the eject signal can be output to the outside.

Responding to the reception of the eject signal from the optical disc drive 117 that is in the power-off state, the system of the computer 10 can execute a process for resuming the use of the optical disc drive 117 (e.g. a process of supplying power to the optical disc drive 117, a process of sending to the optical disc drive 117 a signal instructing the opening of the tray 301, etc.)

The spindle motor 303 is a motor for rotating the medium (optical disc medium) that is loaded in the optical disc drive 117. The optical pickup head 304 radiates a light beam (laser beam) on the medium, and outputs a detection signal corresponding to reflective light from the medium. The optical pickup head 304 is moved in the radial direction of the medium by a thread mechanism (optical pickup head moving mechanism) which is provided in the tray 301.

Figure 2:
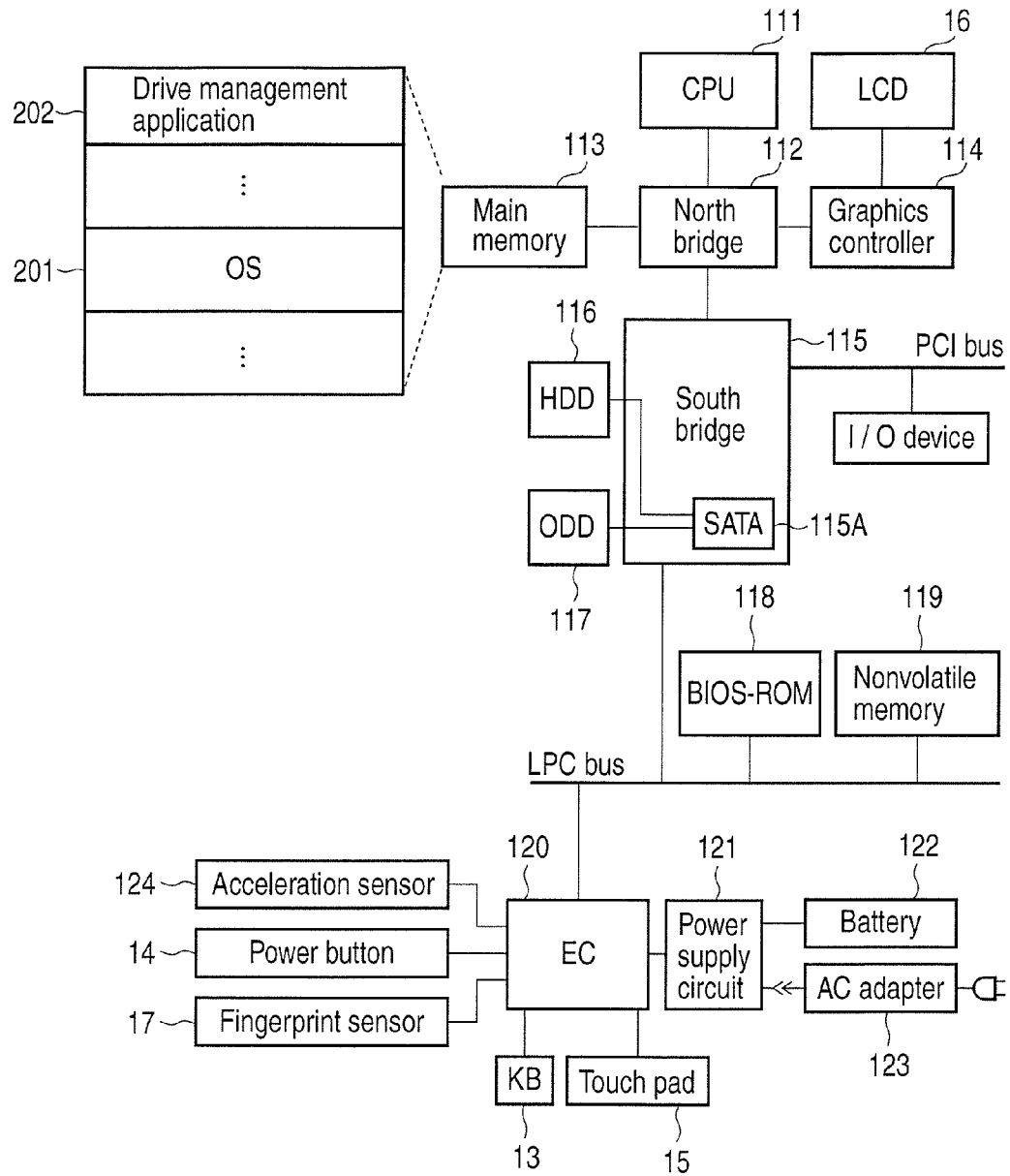
FIG. 2 is an exemplary block diagram illustrating a system configuration of the information processing apparatus of the embodiment.

FIG. 2 shows the system configuration of the computer 10.

The computer 10 comprises a CPU 111, a north bridge 112, a main memory 113, a graphics controller 114, a south bridge 115, a hard disk drive (HDD) 116, an optical disc drive (ODD) 117, a BIOS-ROM 118, a nonvolatile memory 119, an embedded controller (EC) 120, a power supply circuit 121, and an acceleration sensor 124.

The CPU 111 is a processor which controls the operations of the components of the computer 10. The CPU 111 executes an operating system (OS) 201 and various application programs, which are loaded from the HDD 116 into the main memory 113. The application programs include a drive management application program 202.

The drive management application program 202 can power off the optical disc drive (ODD) 117, where necessary, while the computer 10 is working. The drive management application program 202 powers off the optical disc drive (ODD) 117, for example, when the non-use state of the optical disc drive (ODD) 117 has continued for a predetermined time period or when an event of requesting power-off of the optical disc drive (ODD) 117 has occurred.

When the drive management application program 202 has received the eject signal from the optical disc drive (ODD) 117 which is in the power-off state, the drive management application program 202 executes a process of supplying power to the optical disc drive (ODD) 117 to automatically power on the optical disc drive (ODD) 117 and a process of sending a signal for instructing the optical disc drive (ODD) 117 to open the tray 301, thereby to resume the use of the optical disc drive (ODD) 117.

Further, the drive management application program 202 has a function of prohibiting the resume of the use of the optical disc drive (ODD) 117 while the user is moving while carrying the computer. To be more specific, when the drive management application program 202 has received the eject signal from the optical disc drive (ODD) 117 which is in the power-down state, the drive management application program 202 determines whether the main body 11, that is, the computer 10, is shaking or not, by using the acceleration sensor 124. In other word, the drive management application program 202 determines whether shake of the main body 11 is detected by the acceleration sensor 124. For example, if the main body 11 is shaking by movement of the computer 10 (e.g. the main body 11 is moved in a back-and-forth direction, an up-and-down direction, or a right-and-left direction), the drive management application program 202 determines that the user is moving while carrying the computer 10. In this case, the drive management application program 202 executes neither a process of powering on the optical disc drive (ODD) 117 nor a process of sending a signal for instructing the optical disc drive (ODD) 117 to open the tray 301.

The user may close the display unit 12 while keeping the power-on state of the computer 10 in which the optical disc drive (ODD) 117 is set in the power-off state, and may move while carrying the computer 10 by the hand or under the arm, for instance. In this case, it is possible that the user's arm may advertently come in contact with the eject button 302. Normally, while the user is moving while carrying the computer 10, the acceleration sensor 124 detects that the main body 11, that is, the computer 10, is shaking. If the computer 10 is shaking, even if the eject signal is detected, the drive management application program 202 executes neither the process of powering on the optical disc drive (ODD) 117 nor the process of sending a signal for instructing the optical disc drive (ODD) 117 to open the tray 301. Therefore, it is possible to prevent the optical disc drive (ODD) 117 from being erroneously powered on, and the tray 301 from being abruptly opened, while the user is moving while carrying the computer 10.

In addition, the CPU 111 executes a BIOS (Basic Input/Output System) which is stored in the BIOS-ROM 118. The BIOS is a program for hardware control.

The north bridge 112 is a bridge device which connects a local bus of the CPU 111 and the south bridge 115. The north bridge 112 has a function of executing communication with the graphics controller 114. Further, the north bridge 112 includes a memory controller which controls the main memory 113.

The graphics controller 114 is a display controller which controls the LCD 16 that is used as a display monitor of the computer 10. The south bridge 115 is connected to a PCI (Peripheral Component Interconnect) bus and an LPC (Low Pin Count) bus.

The HDD 116 and ODD 117 are connected to the south bridge 115 via a serial ATA (SATA) bus or the like. The south bridge 115 includes a SATA controller 115A. The SATA controller 115A is a controller for controlling the HDD 116 and ODD 117.

The embedded controller (EC) 120 is a controller for power management. The embedded controller (EC) 120 may include a keyboard controller which controls the keyboard (KB) 13 and touch pad 15. The EC 120 cooperates with the power supply circuit 121 to power on/off the computer 10 in response to the user's operation of the power button switch 14. The power supply circuit 121 uses power from a battery 122 which is built in the computer main body 11 or external power which is supplied via an AC adapter 123, thereby generating system power that is to be supplied to the respective components of the computer 10. Furthermore, under the control of the BIOS, the EC 120, in cooperation with the power supply circuit 121, can power on/off only the optical disc drive (ODD) 117. Furthermore, the EC 120 has a function of detecting the above-described eject signal which is output from the optical disc drive (ODD) 117, and a function of sending an eject signal (pseudo-eject signal) to the optical disc drive (ODD) 117.

The acceleration sensor 124 is realized, for example, as a three-dimensional acceleration sensor. The acceleration sensor 124 can determine whether the main body 11 is shaking or not, or in other words, can detect a movement of the main body 11 in the back-and-forth direction, up-and-down direction, and right-and-left direction. To be more specific, the acceleration sensor 124 detects the acceleration of the main body 11 in an X-axis direction, a Y-axis direction and a Z-axis direction, and outputs acceleration data indicative of the result of the detection.

Next, referring to FIG. 3, an example of the structure of the optical disc drive (ODD) 117 is described.

The optical disc drive (ODD) 117 comprises a controller 401 and a tray eject mechanism 402, in addition to the above-described spindle motor 303 and optical pickup head 304. When the eject button 302 is pressed by the user, an eject signal of, e.g. a pulse shape is generated. Regardless of whether the optical disc drive (ODD) 117 is in the power-on state or in the power-off state, the eject signal is sent to an eject signal input terminal of the controller 401 and is also output to the outside of the optical disc drive (ODD) 117 via an eject signal input/output terminal 403 and an eject signal line 404. The eject signal input/output terminal 403 is an input/output terminal which is provided on the optical disc drive (ODD) 117. The eject signal input/output terminal 403 can bidirectionally connect the optical disc drive (ODD) 117 and a host system.

During the period in which the optical disc drive (ODD) 117 is in the power-on state, the controller 401 can detect the eject signal. Responding to the reception of the eject signal, the controller 401 opens the tray 301 by controlling the eject mechanism 402.

The EC 120 is bidirectionally connected to the optical disc drive (ODD) 117 via the eject signal input/output terminal 403 and eject signal line 404. The EC 120 can receive the eject signal from the optical disc drive (ODD) 117 via the eject signal line 404. The EC 120 notifies, for example, the BIOS of the reception of the eject signal. The BIOS notifies the drive management application program 202 of the reception of the eject signal. Thereby, the drive management application program 202 can detect the pressing operation of the eject button 302. In addition, the EC 120 can send an eject signal (also referred to as "pseudo-eject signal") to the optical disc drive (ODD) 117 via the eject signal line 403.

The optical disc drive (ODD) 117 may be configured to output the eject signal to the outside, only when the eject button 302 has been pressed during the period in which the optical disc drive (ODD) 117 is in the power-off state. In this case, although the eject signal is generated in response to the pressing operation of the eject button 302 regardless of whether the optical disc drive 117 is in the power-on state or in the power-off state, this eject signal is output to the outside only when the optical disc drive 117 is in the power-off state.

Next, referring to a flow chart of FIG. 4, a description is given of the outline of a drive control process which is executed by the drive management application program 202.

The drive management application program 202 can detect, for example, in cooperation with the EC 120 and the BIOS, whether the eject button 302 has been pressed. When the drive management application program 202 has detected that the eject button 302 has been pressed, or in other words, when the drive management application program 202 has received the eject signal from the optical disc drive (ODD) 117 via the EC 120 and the BIOS (step S11), the drive management application program 202 determines whether the optical disc drive (ODD) 117 is in the power-on state or not (step S12). If the optical disc drive (ODD) 117 is in the power-on state (YES in step S12), the drive management application program 202 executes no operation and finishes the process.

On the other hand, if the optical disc drive (ODD) 117 is in the power-off state (NO in step S12), the drive management application program 202 reads acceleration data from the acceleration sensor 124, and determines, based on the acceleration data, whether the main body 11 is shaking or not (step S13).

If the main body 11 is not shaking (NO in step S13), the drive management application program 202, in cooperation with the EC 120, supplies power to the optical disc drive (ODD) 117 and switches the power state of the optical disc drive (ODD) 117 from the power-off state to the power-on state (step S14). After supplying power to the optical disc drive (ODD) 117, the drive management application program 202 determines whether the optical disc drive (ODD) 117 has transitioned to a ready state (step S15). Whether the optical disc drive (ODD) 117 has transitioned to the ready state can be determined, for example, by the drive management application program 202 polling the SATA controller 115A. The drive management application program 202 stands by until the optical disc drive (ODD) 117 has transitioned to the ready state. When it is determined that the optical disc drive (ODD) 117 is in the ready state (step S15), the drive management application program 202 instructs the optical disc drive (ODD) 117 to open the tray 301 (step S16). In step S16, the drive management application program 202 instructs, for example, the EC 120 to send the pseudo-eject signal to the optical disc drive (ODD) 117. In the meantime, instead of sending the pseudo-eject signal to the optical disc drive (ODD) 117, an eject command may be sent to the optical disc drive (ODD) 117 via the SATA controller 115A.

A certain fixed time is needed from when the optical disc drive (ODD) 117 is powered on to when the controller 401 transitions to an operable state. The tray 301 is not opened if the pseudo-eject signal or eject command is sent to the optical disc drive (ODD) 117 before the controller 401 transitions to the operable state, that is, before the optical disc drive (ODD) 117 transitions to the ready state. Such a configuration may be adopted that the pseudo-eject signal or eject command is sent when an elapsed time from power-on of the optical disc drive (ODD) 117 has reached a predetermined standby time. In usual cases, however, the time, which is needed from when the optical disc drive (ODD) 117 is powered on to when the controller 401 transitions to the operable state, varies depending on the kind of the optical disc drive (ODD) 117 which is mounted in the computer 10. Thus, in order to ensure the adaptability to various kinds of optical disc drives (ODD), it is necessary to set the above-described standby time to a relatively long time. However, if the standby time is set to a relatively long time, the timing of the opening of the tray 301 would be delayed.

In the present embodiment, it is actually determined whether the optical disc drive (ODD) 117 is in the ready state or not. Therefore, it is possible to send the pseudo-eject signal or eject command to the optical disc drive (ODD) 117 at an optimal timing.

In step S13, if it is determined that the main body 11 is shaking (YES in step S13), the drive management application program 202 executes no operation and finishes the process.

In the flow chart of FIG. 4, the description has been given of the example in which when the pressing operation of the eject button 302 has been detected, it is determined whether the present power state of the optical disc drive (ODD) 117 is the power-off state or not. Alternatively, the process of step S13 and the following steps in FIG. 4 may be started on condition that the pressing operation of the eject button 302 has been detected during the period in which the optical disc drive (ODD) 117 is the power-off state. In other words, the drive control process for resuming the use of the optical disc drive (ODD) 117 may be executed by using, as a trigger, only the eject signal which occurs during the period in which the optical disc drive (ODD) 117 is the power-off state.

Next, referring to a flow chart of FIG. 5, a description is given of an example of the procedure of the drive control process. The case is now assumed in which the optical disc drive (ODD) 117 is already set in the power-off state.

When the eject button 302 has been pressed by the user (step S101), the optical disc drive (ODD) 117 outputs an eject signal to the outside (step S102). The EC 120 receives the eject signal from the optical disc drive (ODD) 117, and notifies the BIOS of the occurrence of the eject signal, for example, by supplying an interrupt signal to the CPU 111 (step S103). The BIOS notifies the drive management application program 202 of the occurrence of the eject signal (step S104).

Upon receiving the notification of the occurrence of the eject signal, the drive management application program 202 determines whether the main body 11 is shaking or not, by using the acceleration sensor 124 (step S105). If the main body 11 is not shaking, the drive management application program 202 sends to the BIOS a message (ODD ON request) requesting power-on of the optical disc drive (ODD) 117 (step S106). Upon receiving the message (ODD ON request), the BIOS requests the EC 120 to power on the optical disc drive (ODD) 117 (step S107). Responding to the reception of the power-on request from the BIOS, the EC 120 supplies power to the optical disc drive (ODD) 117 and powers on the optical disc drive (ODD) 117 (step S108). The optical disc drive (ODD) 117 transitions to the power-on state (step S109).

After requesting the EC 120 to power on the optical disc drive (ODD) 117, the BIOS notifies the OS that the optical disc drive (ODD) 117 has been powered on (or the optical disc drive (ODD) 117 has been detected) (step S110). The OS 201 adds the optical disc drive (ODD) 117 to the list of devices which are managed by the OS 201 (step S111), and recognizes the optical disc drive (ODD) 117 as a device in the computer 10 (step S112).

After sending the message (ODD ON request) to the BIOS, the drive management application program 202 checks the state of the optical disc drive (ODD) 117 and determines whether the optical disc drive (ODD) 117 is in the ready state or not (step S122). If it is determined that the optical disc drive (ODD) 117 is in the ready state, the drive management application program 202 sends an eject request message to the BIOS (step S123). The BIOS requests the EC 120 to send a pseudo-eject signal (step S124). The EC 120 sends the pseudo-eject signal to the optical disc drive (ODD) 117 (step S125). The controller 401 in the optical disc drive (ODD) 117 executes a tray open operation for projecting the tray 301 to the outside, and opens the tray 301 (step S216).

In the meantime, prior to checking the shake in step S105, the drive management application program 202 may determine whether the optical disc drive (ODD) 117 is in the power-off state or not. The checking of the shake in step S105 may be executed only when it is determined that the optical disc drive (ODD) 117 is in the power-off state. The EC 120 may determine whether the optical disc drive (ODD) 117 is in the power-off state or not, and may notify the BIOS of the occurrence of the eject signal, only when the optical disc drive (ODD) 117 is in the power-off state.

Figure 6:
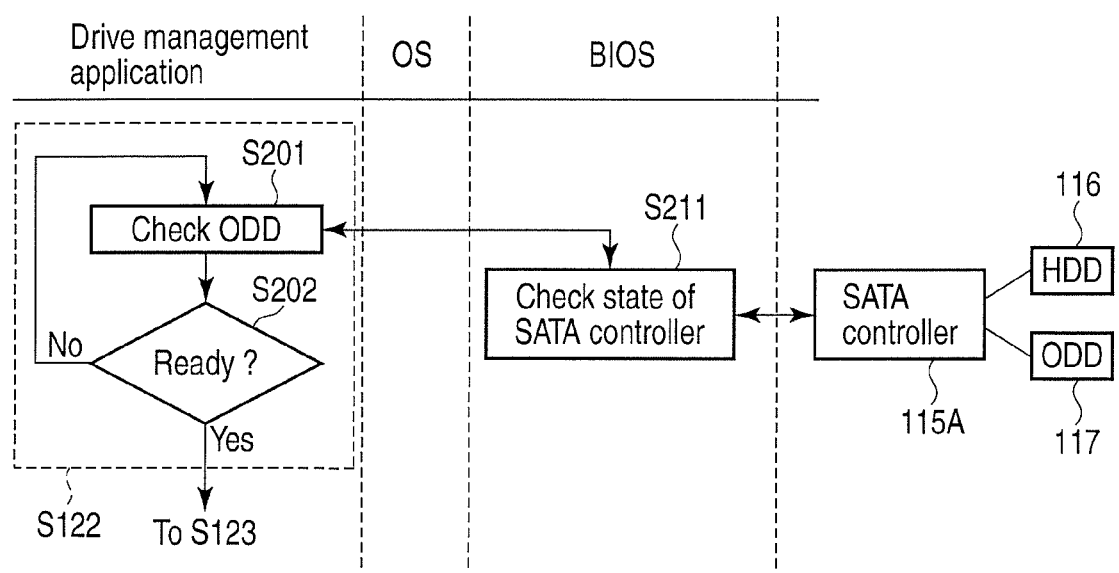
FIG. 6 is an exemplary flow chart illustrating an example of the procedure of a drive state check process which is executed by the information processing apparatus of the embodiment.

Next, referring to FIG. 6, a description is given of an example of the procedure of an ODD state check process which is executed in step S122 in FIG. 5.

In order to determine whether the optical disc drive (ODD) 117 is in the ready state or not, the drive management application program 202 requests the BIOS to check the state of the optical disc drive (ODD) 117 (step S201). The BIOS reads a status register in the SATA controller 115A, checks the state of the optical disc drive (ODD) 117, and returns information indicative of the present state (ready state or non-ready state) of the optical disc drive (ODD) 117 to the drive management application program 202.

The status register in the SATA controller 115A includes device ready data which indicates, for example, whether the optical disc drive (ODD) 117 is in the ready state or not. By reading the device ready data, the present state (ready state or non-ready state) of the optical disc drive (ODD) 117 can be determined.

The drive management application program 202 repeatedly requests the BIOS to check the state of the optical disc drive (ODD) 117, until it is determined that optical disc drive (ODD) 117 is in the ready state (step S202).

Next, referring to a flow chart of FIG. 7, a description is given of a drive power management process which is executed by the computer 10.

When the computer 10 is powered on, the EC 120 powers on various devices in the computer 10 (step S301). In step S301, the optical disc drive (ODD) 117 is also powered on. The CPU 111 executes the BIOS. The BIOS executes a power-on self test process (POST) (step S302). Then, the BIOS boots the OS 201 (step S303). After the OS 201 is booted, the drive management application program 202 is automatically started (step S304). The drive management application program 202 executes the following process.

When the non-use state of the optical disc drive (ODD) 117 has continued for a predetermined time period (YES in step S305) or when an event of requesting power-off of the optical disc drive (ODD) 117 has been generated by the user's operation (YES in step S306), the drive management application program 202 powers off the optical disc drive (ODD) 117 (step S307).

The drive management application program 202 recognizes, for example, the state in which no medium is loaded in the optical disc drive (ODD) 117 and the tray 301 is closed, as the non-use state of the optical disc drive (ODD) 117. If the state in which no medium is loaded and the tray 301 is closed has continued for a predetermined period (e.g. one minute), the drive management application program 202, in cooperation with the BIOS and EC 120, automatically stops power supply to the optical disc drive (ODD) 117 and powers off the optical disc drive (ODD) 117.

A hot key operation, for instance, can be used as the user's operation for generating an event of requesting power-off of the optical disc drive (ODD) 117. For example, the user can request power-off of the optical disc drive (ODD) 117 by simultaneously operating a plurality of predetermined keys of the keyboard 13. In addition, the user can instruct power-on of the optical disc drive (ODD) 117 by operating another hot key.

After the optical disc drive (ODD) 117 is powered off, the drive management application program 202 restores the optical disc drive (ODD) 117 to the power-on state by using, as a trigger, the operation of the eject button 302, the occurrence of an event of requesting power-on of the optical disc drive (ODD) 117 by the user's operation, or the start of a predetermined application program which is associated with the optical disc drive (ODD) 117.

Specifically, the drive management application program 202 first determines whether the eject button 302 has been pressed (step S308). If the eject button 302 has been pressed (YES in step S308), the drive management application program 202 determines whether the main body 11 is shaking or not, by using the acceleration sensor 124 (step S309). If the main body is not shaking (NO in step S309), the drive management application program 202, in cooperation with the EC 120, executes a process of supplying power to the optical disc drive (ODD) 117, and a process of instructing the optical disc drive (ODD) 117 to open the tray 302 (step S310). On the other hand, if it is determined that the main body is shaking (YES in step S309), the drive management application program 202 does not execute the process of step S310.

When the event of requesting power-on of the optical disc drive (ODD) 117 has been generated by, for example, a hot key operation by the user in the state in which the optical disc drive (ODD) 117 is powered off (YES in step S311), the drive management application program 202, in cooperation with the EC 120, executes a process of supplying power to the optical disc drive (ODD) 117 (step S313). In addition, when a predetermined application program which is associated with the optical disc drive (ODD) 117 has been executed in the state in which the optical disc drive (ODD) 117 is powered off (YES in step S312), the drive management application program 202, in cooperation with the EC 120, executes a process of supplying power to the optical disc drive (ODD) 117 (step S313). The predetermined application program is an application program which is configured to operate with use of the optical disc drive (ODD) 117.

As has been described above, according to the present embodiment, the power state of the optical disc drive (ODD) 117 can easily be restored from the power-off state to the power-on state by operating the eject button 302. In addition, since the power-on of the optical disc drive (ODD) 117 and the opening of the tray are prohibited when the main body is shaking, it is possible to prevent the optical disc drive (ODD) 117 from being erroneously powered on, and the tray 301 from being abruptly opened, while the user is moving while carrying the computer 10.

In the present embodiment, the description has been given of the example in which the drive control process of restoring the optical disc drive (ODD) 117 from the power-off state to the power-on state in response to the operation of the eject button 302 is executed by the drive management application program 202. Alternatively, this drive control process may be executed by the BIOS or the OS. In addition, the drive control process may be executed by hardware, for example, the EC 120.

Besides, the presence/absence of a shake may be determined when the EC 120 has received the eject signal from the optical disc drive (ODD) 117 which is in the power-off state, and only when the main body 11 is not shaking, may the occurrence of the eject signal be reported to the software (e.g. the BIOS, OS or drive management application program 202) which executes the drive control process.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a main body;
an optical disc drive provided in the main body, configured to output an eject signal to an outside in response to an operation of an eject button;
an acceleration sensor provided in the main body; and
a drive management module provided in the main body, configured to determine whether the main body is shaking or not by using the acceleration sensor when the eject signal is received from the optical disc drive which is in a power-off state, and to supply power to the optical disc drive and send to the optical disc drive a signal instructing opening of a tray of the optical disc drive, when the main body is not shaking.

2. The information processing apparatus of claim 1, wherein the drive management module is configured to determine, after supplying the power to the optical disc drive, whether the optical disc drive is in a ready state or not, and to send to the optical disc drive the signal instructing the opening of the tray when it is determined that the optical disc drive is in the ready state.

3. The information processing apparatus of claim 1, wherein the drive management module is configured to power off the optical disc drive when a non-use state of the optical disc drive has continued for a predetermined period.

4. The information processing apparatus of claim 1, wherein the drive management module is configured to power off the optical disc drive when an event of requesting power-off of the optical disc drive is occurred.

5. An information processing apparatus comprising:
a main body;
an optical disc drive provided in the main body, configured to output an eject signal to an outside, the eject signal being generated by an operation of an eject button regardless of whether the optical disc drive is in a power-on state or not;
an acceleration sensor provided in the main body; and
a drive management module provided in the main body, configured to power off the optical disc drive, to determine whether the main body is shaking or not by using the acceleration sensor when the eject signal is received from the optical disc drive which is in a power-off state, and to supply power to the optical disc drive and send to the optical disc drive a signal instructing opening of a tray of the optical disc drive, when the main body is not shaking.

6. The information processing apparatus of claim 5, wherein the drive management module is configured to determine, after supplying the power to the optical disc drive, whether the optical disc drive is in a ready state or not, and to send to the optical disc drive the signal instructing the opening of the tray when it is determined that the optical disc drive is in the ready state.

7. A drive control method of controlling an optical disc drive in an information processing apparatus, the method comprising:
  powering off the optical disc drive configured to output an eject signal to an outside in response to an operation of an eject button;
  determining whether the information processing apparatus is shaking or not by using an acceleration sensor in the information processing apparatus, when the eject signal is received from the optical disc drive which is in a power-off state; and
  supplying power to the optical disc drive and sending to the optical disc drive a signal instructing opening of a tray of the optical disc drive, when the information processing apparatus is not shaking.

8. The drive control method of claim 7, further comprising:
  determining, after supplying the power to the optical disc drive, whether the optical disc drive is in a ready state or not,
  wherein when it is determined that the optical disc drive is in the ready state, the signal instructing the opening of the tray is sent to the optical disc drive.

* * * * *